F. KEELER.
Vehicle Spring.
No. 99,776. Patented Feb. 15, 1870.
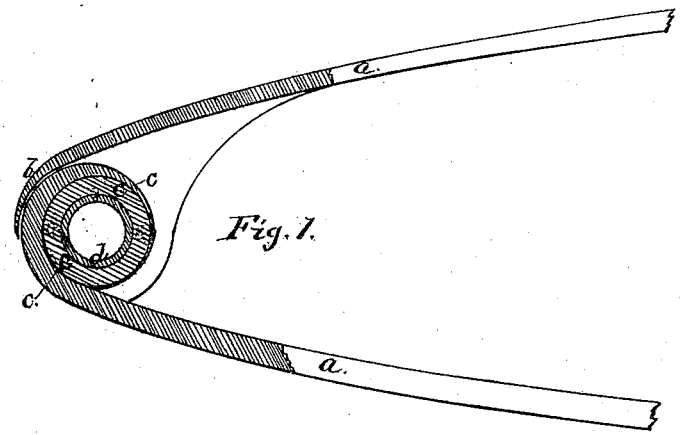
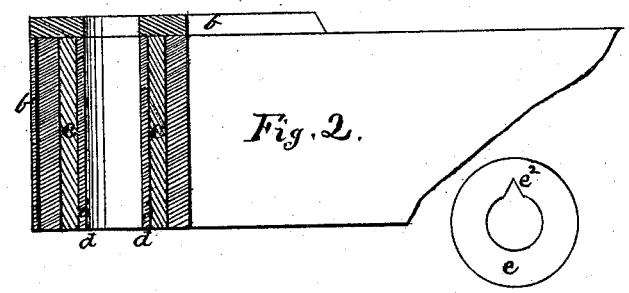
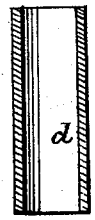 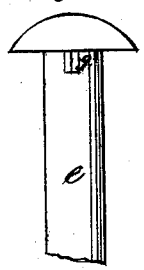
Witnesses.
W. G. Lineburgh
Laura A. Hubbell
Inventor;
Frank Keeler

United States Patent Office.

FRANK KEELER, OF BRIDGEPORT, CONNECTICUT, ASSIGNOR TO TOMLINSON SPRING AND AXLE COMPANY, OF SAME PLACE.

Letters Patent No. 99,776, dated February 15, 1870.

IMPROVEMENT IN ELLIPTIC SPRINGS.

The Schedule referred to in these Letters Patent and making part of the same

I, FRANK KEELER, of Bridgeport, in the county of Fairfield, State of Connecticut, have invented certain Improvements in Elliptic Springs, of which the following is a specification.

Nature and Object of my Invention.

To so combine and arrange an elastic packing with metallic thimble and fixed bolt in the eye of elliptic springs that it will relieve much of the wear and strain to the spring caused by concussion in use.

Description of Accompanying Drawings.

Figure 1 is a sectional view of eye and leaf of spring.
Figure 2, transverse section of same.
Figures 3 and 4, details of bolt and ear.

General Description.

$a\ a$, fig. 1, shows the leaf of spring with the eye filling.
$b\ b$, figs. 1 and 2, show the locking springs.
$c\ c$, figs. 1 and 2, the elastic packing.
Fig. 3 shows the thimble cut lengthwise.
Fig. 4 shows the bolt with stop $c^2$.

The manner of construction is readily understood. I make the eye of leaf about double the size usually used. The ear is forged to match this. I then take a brass or steel thimble of the proper size to fit bolt, and force it through a rubber or other elastic material whose outside diameter is greater than the inside diameter of the eye of leaf. The elasticity of the rubber draws it tight around the thimble. I then force the whole through the eye of leaf.

I also forge the projecting wedge for the bolt $e$, and cut the corresponding recess $g$ in ear, to form a stop for the purpose of keeping the bolt in one position, and assist me in turning the nut home.

I do not claim the insertion of rubber in the eye of leaf as new. The novelty of my invention consists in the introduction of the thimble or friction-sleeve around bolt to receive the rotary wear caused by the elliptic action of leaves when the same are at work, and allowing the elastic material to act only as a cushion.

To make the invention still more effective, I arrange the wedge-shaped projection or bolt and corresponding recess $g$ in the ear, to keep the bolt in one position, thereby making the wear equal and true; whereas, if it was loose, and allowed to rotate by the motion of the spring, it becomes worn, irregular, and greatly increases the wear. This stop also prevents its rattling, and holds the bolt from turning when the nut is turned up. It also tends to keep the nut from working loose and working off, common in cases where the bolt is allowed to revolve.

Forging the eye of head larger gives me more strength and a truer opening.

What I claim, and desire to secure by Letters Patent, is—

In elliptic springs, the rubber packing $c\ c$, the friction-thimble $d\ d$, the bolt $e$, having the rib $g$ formed on its side, with a corresponding recess in the ear of spring, all combined and arranged as herein set forth.

FRANK KEELER.

Witnesses:
W. G. LINEBURGH,
LAURA A. HUBBELL.